United States Patent [19]
Iritani

[11] Patent Number: 5,839,655
[45] Date of Patent: Nov. 24, 1998

[54] HOT-WATER HEATING SYSTEM

[75] Inventor: Koji Iritani, Kawagoe, Japan

[73] Assignee: Sunpot Co., Ltd., Saitama-ken, Japan

[21] Appl. No.: 886,232

[22] Filed: Jul. 1, 1997

[30] Foreign Application Priority Data

Jul. 1, 1996 [JP] Japan ................................. 8-171370

[51] Int. Cl.$^6$ ........................................ F24D 3/00
[52] U.S. Cl. ........................... 237/8 A; 237/8 R
[58] Field of Search ............. 237/63, 8 R, 8 A; 62/185, 201

[56] References Cited

FOREIGN PATENT DOCUMENTS 63-201431  8/1988  Japan .
63-210535  9/1988  Japan .

*Primary Examiner*—Henry A. Bennett
*Assistant Examiner*—Derek S. Boles
*Attorney, Agent, or Firm*—Paul A. Guss

[57] ABSTRACT

A hot-water heating system has a heater for producing hot water, a heat radiator, a supply pipe for supplying them hot water from the heater to the heat radiator, a return pipe for returning the heat radiator to the heater, and a circulation pump for circulating the hot water from the heater successively through the supply pipe, the heat radiator, and the return pipe. A supply pipe temperature sensor for detecting the temperature of the hot water flowing through the supply pipe is mounted on an outer surface of the supply pipe. A return pipe temperature sensor for detecting the temperature of the hot water flowing through the return pipe is mounted on an outer surface of the return pipe. A control unit controls the circulation pump to reduce an output rate thereof as the difference between the temperatures of the hot water detected by the supply pipe temperature sensor and the return pipe temperature sensor is reduced.

5 Claims, 4 Drawing Sheets

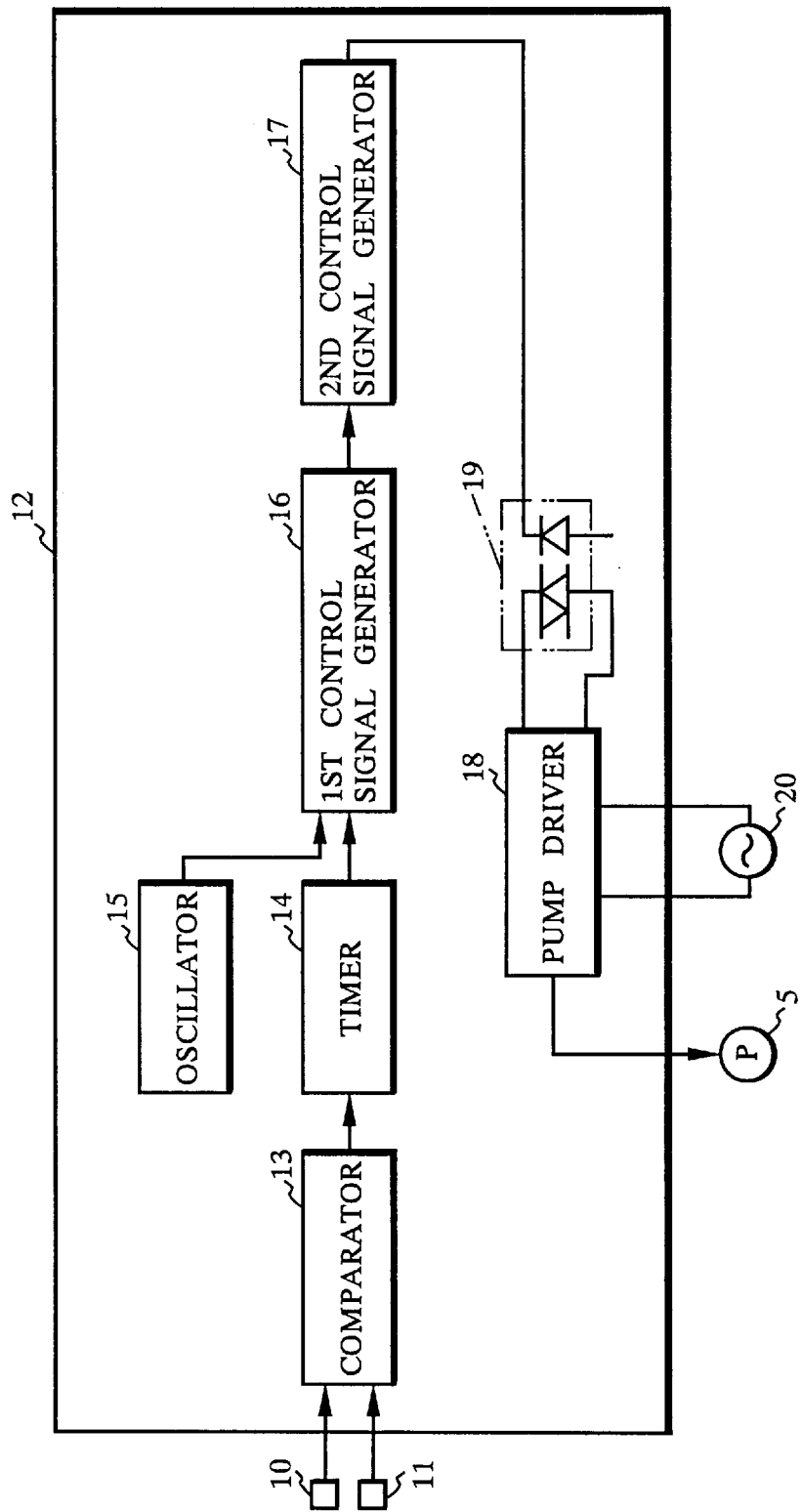

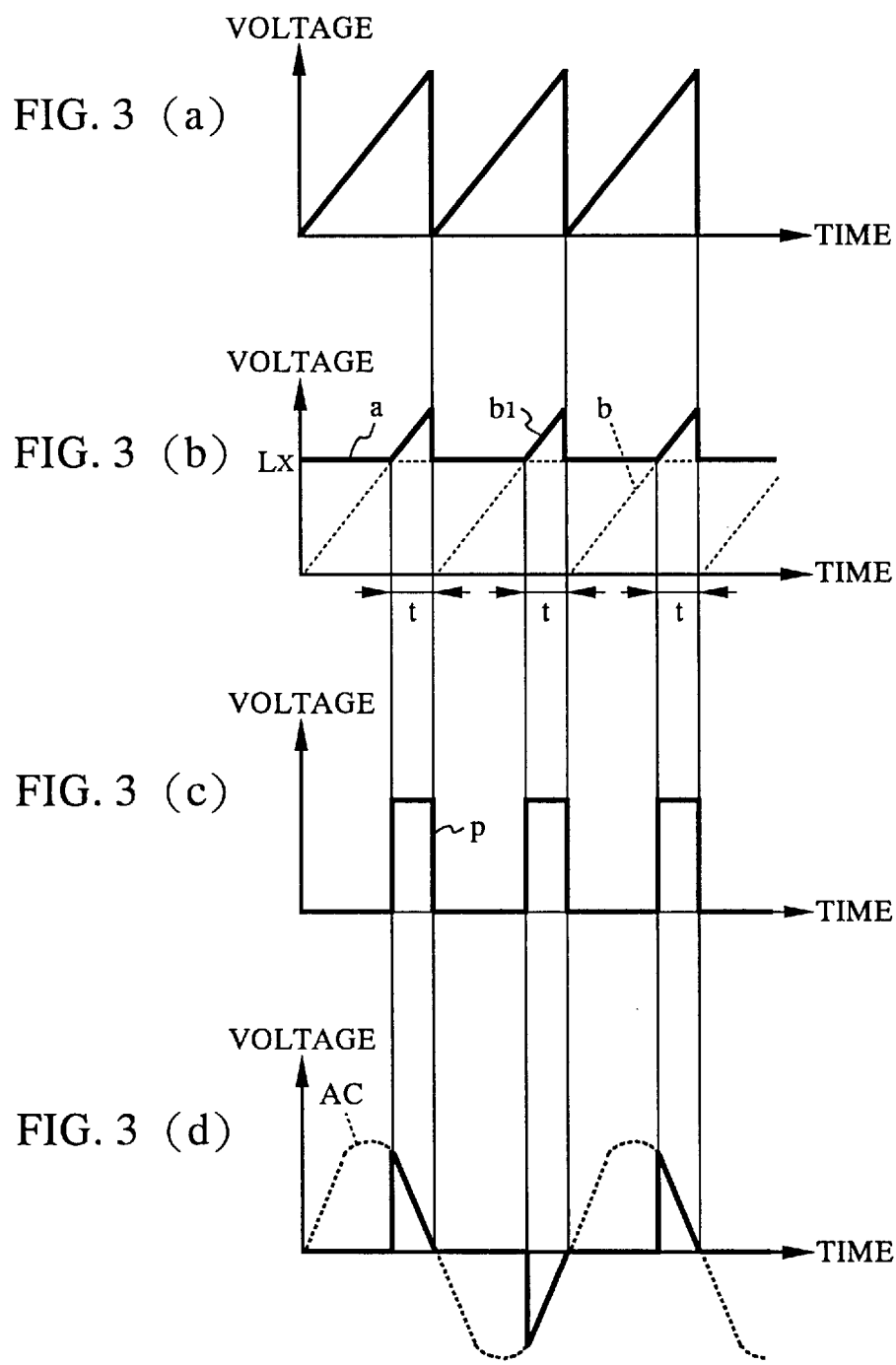

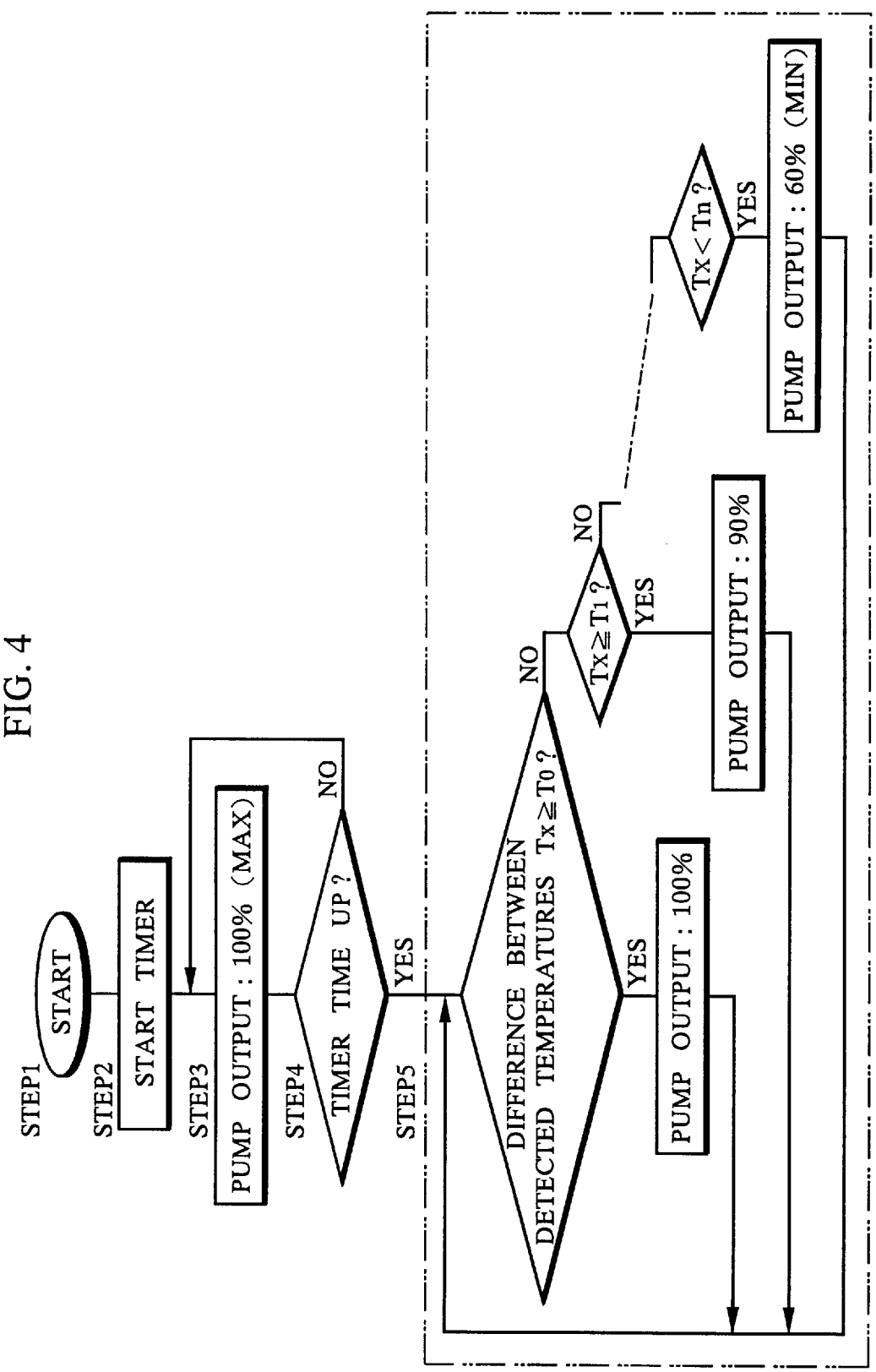

HOT-WATER HEATING SYSTEM

BACKGROUND OF THE INVENTION

1. Field of the Invention

The present invention relates to a hot-water heating system for circulating hot water heated by a heater through heat radiators to heat rooms or the like with the heat radiated from the heat radiators.

2. Description of the Prior Art

Hot-water heating systems heat a room of the like with the heat of hot water in a tank heated by a heater such as a boiler of the like and supplied from the tank. The hot water which has been heated to a substantially constant temperature by the heater is supplied by a circulation pump from the heater through supply pipes to a plurality of heat radiators such as heating floor panels, panel heaters, etc., and then back from the heat radiators through return pipes to the heater. While the hot water is circulating through the heat radiators, the heat thereof is radiated from the heat radiator to heat the room or the like.

The circulation pump always operates at 100% of its rated output capability for supplying a sufficient amount of thermal energy to the heat radiators so that all the heat radiators can be actuated to radiate a large amount of heat.

In the conventional hot-water heating systems, however, the circulation pump operates at 100% of its rated output capability even when the heating load on the hot-water heating system is small, e.g., even when the number of heat radiators actually in use among all the available heat radiators is small, or the amount of heat radiated from the heat radiators is small. Therefore, when heating load on the hot-water heating system is small, the circulation pump supplies more hot water than necessary to the heat radiators, and hence the circulation pump is wasteful of energy.

SUMMARY OF THE INVENTION

It is therefore an object of the present invention to provide a hot-water heating system which is capable of operating a circulation pump at a pump output rate commensurate with a heating load imposed on the hot-water heating system, and which has an improved energy consumption efficiency.

To achieve the above object, there is provided in accordance with the present invention a hot-water heating system comprising a heater for producing hot water, a heat radiator, a supply pipe for supplying them hot water from the heater to the heat radiator, a return pip for returning the heat radiator to the heater, a circulation pump for circulating the hot water from the heater successively through the supply pipe, the heat radiator, and the return pipe, a supply pipe temperature sensor for detecting the temperature of the hot water flowing through the supply pipe, a return pipe temperature sensor for detecting the temperature of the hot water flowing through the return pipe, and a control unit for controlling the circulation pump to reduce an output rate thereof as the difference between the temperatures of the hot water detected by the supply pipe temperature sensor and the return pipe temperature sensor is reduced.

The difference between the temperature of the hot water in the supply pipe and the temperature of the hot water in the return pipe corresponds to an amount of heat dissipated while the hot water is flowing from the supply pipe through the heat radiator into the return pipe, and hence is indicative of a heating load imposed on the hot-water heating system. The smaller the heating load imposed on the hot-water heating system, the smaller the difference between the temperature of the hot water in the supply pipe and the temperature of the hot water in the return pipe. The circulation pump is controlled such that the output rate of the circulation pump is reduced as the difference between the detected temperatures is smaller. In this manner, the output rate of the circulation pump is commensurate with the heating load imposed on the hot-water heating system. As the heating load imposed on the hot-water heating system is reduced, the output rate of the circulation pump is reduced accordingly.

Therefore, the circulation pump is operated at an output rate commensurate with the heating load for an improved efficiency with which the hot-water heating system consumes energy.

If the circulation pump comprises a motor-driven pump energizable by an AC power supply, then the control unit comprises means for determining a period to energize the circulation pump depending on the difference between the temperatures of the hot water detected by the supply pipe temperature sensor and the return pipe temperature sensor, and energizing the circulation pump with the AC power supply during the determined period thereby to control the output rate of the circulation pump.

Specifically, the means for determining a period to energize the circulation pump comprises means for generating a signal having a level which is greater as the difference between the temperatures of the hot water detected by the supply pipe temperature sensor and the return pipe temperature sensor is smaller, means for generating a triangular-wave signal in synchronism with electric energy from the AC power supply, and means for determining as the period a period in which the level of the triangular-wave signal is not smaller than the level of the generated signal. The level of the generated signal is greater as the difference between the temperatures of the hot water detected by the supply pipe temperature sensor and the return pipe temperature sensor is reduced. The period in which the level of the triangular-wave signal is not smaller than the level of the generated signal, i.e., the period in which the circulation pump is energized, is shorter as the difference between the temperatures of the hot water detected by the supply pipe temperature sensor and the return pipe temperature sensor is reduced.

By thus determining the period in which the circulation pump is energized depending on the difference between the temperatures of the hot water detected by the supply pipe temperature sensor and the return pipe temperature sensor (the period is shorter as the difference between the detected temperatures is reduced), the output rate of the circulation pump is phase-controlled.

Preferably, the control unit comprises means for controlling the output rate of the circulation pump substantially at a maximum output rate for a predetermined period of time after the hot-water heating system has started to operate, and controlling the output rate of the circulation pump based on the difference between the temperatures of the hot water detected by the supply pipe temperature sensor and the return pipe temperature sensor after elapse of the predetermined period of time.

Specifically, immediately after the hot-water heating system has started to operate, it is preferable to supply as much hot water as possible to the heat radiator for accelerating the heating operation of the hot-water heating system. Generally, however, the temperature of the hot water in the supply pipe and the temperature of the hot water in the return pipe are substantially the same each other immediately after the hot-water heating system has started to operate. Therefore, if the output rate of the circulation pump were controlled depending on the difference between the temperatures of the hot water detected by the supply pipe temperature sensor and the return pipe temperature sensor immediately after the hot-water heating system has started to operate, then the output rate of the circulation pump would become too small, and the hot water would be supplied at an insufficient rate to the heat radiator, thus making it difficult to achieve a quick heating effect. According to the present invention, for the predetermined period of the time after the hot-water heating system has started to operate, the output rate of the circulation pump is controlled substantially at the maximum output rate for supplying the hot water at a large rate to the heat radiator in an initial stage of the operation of the hot-water heating system. Therefore, the heating effect can be increased in the initial stage of the operation of the hot-water heating system.

The supply pipe temperature sensor is preferably fixedly mounted on an outer surface of the supply pipe, and the return pipe temperature sensor is preferably fixedly mounted on an outer surface of the return pipe.

With these temperature sensors fixedly mounted on the respective outer surfaces of the supply pipe and the return pipe, it is not necessary to provide the supply pipe and the return pipe with joints for installation of the temperature sensors, and hence there is no danger of a leakage of hot water from the supply pipe and the return pipe.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 2 is a block diagram of a control unit of the hot-water heating system shown in FIG. 1;

FIGS. 3(a) through 3(d) are diagrams illustrative of the manner in which the hot-water heating system shown in FIG. 1 operates; and FIG. 4 is a flowchart of an operation sequence of the hot-water heating system shown in FIG. 1.

DETAILED DESCRIPTION OF THE PREFERRED EMBODIMENT

Figure 1:
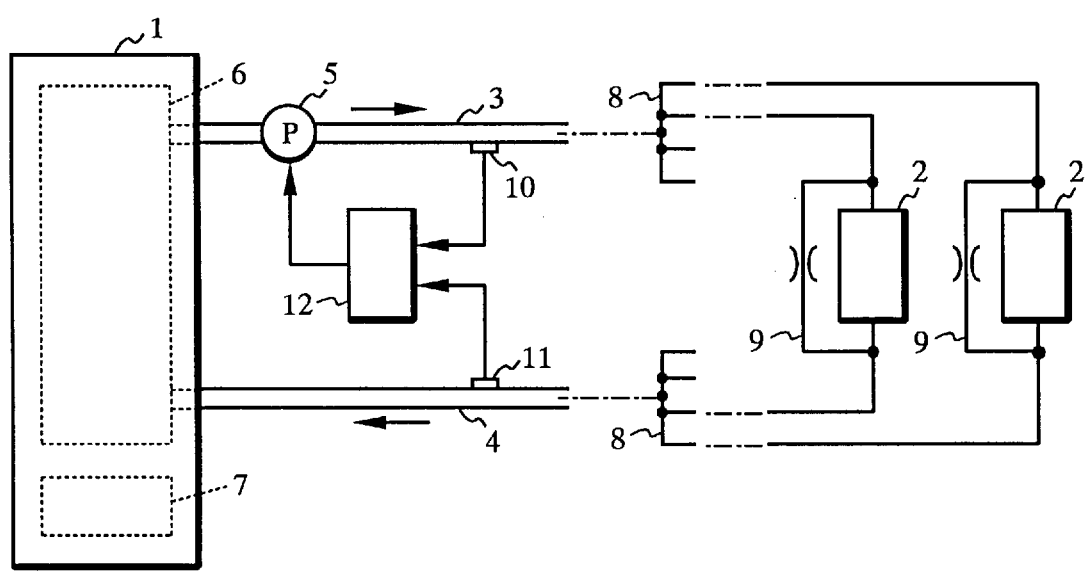
FIG. 1 is a block diagram of a hot-water heating system according to the present invention.

As shown in FIG. 1, a hot-water heating system according to the present invention comprises a boiler 1 as a heater, a plurality of heat radiators 2 such as heating floor panels, panel heaters, etc. in rooms, and a supply pipe 3 and a return pipe 4 connected between the boiler 1 and the heat radiators 2. A circulation pump 5 is connected to one of the supply pipe 3 and the return pipe 4, e.g., the supply pipe 3.

The boiler 1 heats water contained in a tank 6 with combustion heat from a burner 7 to turn the water into hot water. The boiler 1 intermittently burns fuel in the burner 7 for thereby keeping the hot water in the tank 6 at a substantially constant temperature.

The supply pipe 3 and the return pipe 4 have respective ends connected to the tank 6 and respective opposite ends connected through headers 8 to the heat radiators 2. The hot water from the tank 6 circulates successively through the supply pipe 3, the heat radiators 2, and the return pipe 4. Each of the heat radiators 2 is associated with a bypass pipe 9 for allowing the hot water to bypass the heat radiator 2 from an upstream end to a downstream end thereof when the heat radiator 2 is not in use.

The circulation pump 5, which serves to circulate the hot water as described above, comprises a motor-driven pump which is supplied with commercial electric energy, such as AC electric energy at a voltage of 100 V, that is phase-controlled to adjust the output rate (rotational speed) of the circulation pump 5.

The hot-water heating system has a control arrangement, described below, for controlling the output rate of the circulation pump 5 while in operation.

The hot-water heating system includes a supply pipe temperature sensor 10 for detecting the temperature of the hot water flowing in the supply pipe 3, a return pipe temperature sensor 11 for detecting the temperature of the hot water flowing in the return pipe 4, and a control unit 12 (control means) for controlling the output rate of the circulation pump 5 based on detected signals from the temperature sensors 10, 11.

The temperature sensors 10, 11, each comprising a thermistor or the like, are fixedly mounted on respective outer surfaces of the supply pipe 3 and the return pipe 4, and issue respective voltage signals depending on the temperatures of the hot water flowing in the supply pipe 3 and the return pipe 4 to the control unit 12.

The control unit 12 comprises electronic circuits which include, as shown in FIG. 2, a comparator 13, a timer 14, an oscillator 15, a first control signal generator 16, a second control signal generator 17, and a pump driver 18.

The comparator 13 compares the difference between the levels of the voltage signals from the temperature sensors 10, 11, i.e., the difference between the temperatures of the hot water flowing in the supply pipe 3 and the return pipe 4, with a plurality of predetermined levels (corresponding to predetermined values of the difference between the temperatures of the hot water flowing in the supply pipe 3 and the return pipe 4), for thereby generating a constant-voltage signal having a level depending on the difference between the temperatures detected by the respective temperature sensors 10, 11. The level of the constant-voltage signal generated by the comparator 13 determines an output rate of the circulation pump 5. Basically, as the difference between the temperatures detected by the respective temperature sensors 10, 11, i.e., the difference between the levels of the voltage signals from the temperature sensors 10, 11, is smaller, the comparator 13 generates a constant-voltage signal whose level is higher. Specifically, if it is assumed that the predetermined values, which correspond to the predetermined levels, of the difference between the temperatures of the hot water flowing in the supply pipe 3 and the return pipe 4 are represented respectively by T0, T1, . . . , Tn (T0>T1>. . . >Tn), the difference between the temperatures detected by the respective temperature sensors 10, 11 is represented by Tx, and the level of the constant-voltage signal generated by the comparator 13 is represented by Lx, then the level Lx of the constant-voltage signal generated by the comparator 13 is determined such that Lx=L0 if Tx≧T0, Lx=L1 if T0>Tx≧T1, . . . , Lx=Ln if Tn−1>Tx≧Tn, and Lx=Ln+1 if Tx<Tn where L0~Ln+1 represent predetermined values (L0<L1<. . . Ln). The minimum level L0 corresponds to a maximum output rate (100% of the rated output capability) of the circulation pump 5, and the maximum level Ln+1 corresponds to a minimum output rate (for example, 60% of the rated output capability) of the circulation pump 5. The levels L1~Ln between these minimum and maximum levels L0, Ln+1 correspond to respective output rates (e.g., 90%, 80%, etc. of the rated output capability) between the maximum and minimum output rates of the circulation pump 5.

The timer 14 measures a predetermined period of time (5 minutes in this embodiment) from the start of operation of the hot-water heating system, while being supplied with the constant-voltage signal from the comparator 13. While the timer 14 is measuring the predetermined period of time, it issues the constant-voltage signal of the minimum level L0 corresponding to the maximum output rate of the circulation pump 5 to the first control signal generator 16, regardless of the level Lx of the constant-voltage signal generated by the comparator 13, i.e., regardless of the difference Tx between the temperatures detected by the respective temperature sensors 10, 11. After the timer 14 has measured the predetermined period of time, the timer 14 issues the constant-voltage signal generated by the comparator 13 directly to the first control signal generator 16.

The oscillator 15 generates a sawtooth-wave signal (triangular-wave signal), as shown in FIG. 3(*a*) which is required to phase-control the output rate of the circulation pump 5, and issues the generated sawtooth-wave signal to the first control signal generator 16.

The first control signal generator 16 extracts a portion "b1" of the sawtooth-wave signal, denoted at "b" in FIG. 3(*b*), above the level Lx of the constant-voltage signal, denoted at "a" in FIG. 3(*b*), from the constant-voltage signal "a" supplied from the comparator 13 through the timer 14 and the sawtooth-wave signal "b" supplied from the oscillator 15, and supplies the extracted signal portion "b1" to the second control signal generator 17. Since the level Lx of the constant-voltage signal generated by the comparator 13 is higher as the difference between the temperatures detected by the respective temperature sensors 10, 11 is smaller, the period "t" of the extracted signal portion "b1" where the level of the sawtooth-wave signal "b" is higher than the level Lx is shorter as the difference between the temperatures detected by the respective temperature sensors 10, 11 is smaller.

The second control signal generator 17 generates a pulse signal "p" as shown in FIG. 3(*c*) for phase-controlling the output rate of the circulation pump 5. Specifically, the second control signal generator 17 generates the pulse signal "p" in synchronism with the extracted signal portion "b1" from the first control signal generator 16, the pulse signal "p" having a pulse duration equal to the period "t" of the extracted signal portion "b1". The second control signal generator 17 applies the generated pulse signal "p" through a phototriac (photocoupler) 19 to the pump driver 18.

The pump driver 18 applies an AC voltage AC (synchronous with the sawtooth-wave signal "b"), as shown in FIG. 3(*d*), from a commercial power supply 20 during the period of the pulse signal "p" to the circulation pump 5 for thereby energizing the circulation pump 5 with an amount of electric energy which corresponds to the period (pulse duration) of the pulse signal "p".

Except while the timer 14 is measuring the predetermined period of time, the circulation pump 5 is supplied with the amount of electric energy corresponding to the difference between the temperatures detected by the respective temperature sensors 10, 11. Therefore, the output rate of the circulation pump 5 is phase-controlled at a value corresponding to the difference between the temperatures detected by the respective temperature sensors 10, 11.

An operation sequence of the hot-water heating system shown in FIG. 1 will be described below with reference to FIG. 4.

When the hot-water heating system starts to operate in STEP 1, the timer 41 of the control unit 12 starts measuring the predetermined period of time (5 minutes) in STEP 2. While the timer 41 is measuring the predetermined period of time, the first control signal generator 16 is supplied with the constant-voltage signal of the minimum level L0 which corresponds to the maximum output rate of the circulation pump 5. Therefore, the first control signal generator 16, the second control signal generator 17, and the pump driver 18 operate in the manner described above to phase-control the circulation pump 5 at 100% (maximum output rate) of its rated output capability in STEP 3 and STEP 4.

Immediately after the hot-water heating system has started to operate, the circulation pump 5 is controlled at 100% (maximum output rate) of its rated output capability for the predetermined period of time (5 minutes) for the following reasons:

Since the temperatures of the hot water in the supply and return pipes 3, 4 are substantially the same as each other immediately after the hot-water heating system has started to operate, the level Lx of the constant-voltage signal generated by the comparator 13 is equal or close to the maximum level Ln+1 which corresponds to the minimum output level of the circulation pump 5. If the constant-voltage signal generated by the comparator 13 were directly used to phase-control the output rate of the circulation pump 5, then because the output rate of the circulation pump 5 would be equal to or closely to a minimum output rate, the rate at which the hot water supplied from the boiler 1 to the heat radiators 2 would be too small to sufficiently radiate the heat of the hot water from the heat radiators 2.

To avoid the above drawback, immediately after the hot-water heating system has started to operate (for 5 minutes), the circulation pump 5 is controlled to operate at 100% (maximum output rate) of its rated output capability irrespective of the difference between the temperatures detected by the respective temperature sensors 10, 11, thus supplying the hot water at a sufficiently high rate to the heat radiators 2 to keep a desired heating effect during an initial stage of the heating process.

If the predetermined period of time measured by the timer 14 has elapsed (YES in STEP 4), then the first control signal generator 16, the second control signal generator 17, and the pump driver 18 control the circulation pump 5 based on the level Lx of the constant-voltage signal which is generated by the comparator 13 depending on the difference Tx between the temperatures detected by the respective temperature sensors 10, 11, at the output rate corresponding to the level Lx of the constant-voltage signal, i.e., the difference Tx between the temperatures detected by the respective temperature sensors 10, 11, in STEP 5.

Specifically, the output rate of the circulation pump 5 is controlled so as to be progressively smaller toward a minimum output rate (60% of its rated output capability) as the difference Tx between the temperatures detected by the respective temperature sensors 10, 11 becomes smaller, such that if $Tx \geq T0$ as a result of the comparison made by the comparator 13, then the circulation pump 5 is controlled at 100% (maximum output rate) of its rated output capability, and if $T0 \geq Tx \geq T1$ as a result of the comparison made by the comparator 13, then the circulation pump 5 is controlled at 90% of its rated output capability.

Therefore, when the heating load on the hot-water heating system is small and the difference between the temperatures of the hot water in the supply and return pipes 3, 4 is small, such as when the number of heat radiators 2 in operation is small or the heating of the rooms has sufficiently progressed and the amount of heat radiated by the heat radiators 2 is small, the output rate of the circulation pump 5 is reduced accordingly, and hence the amount of electric energy consumed by the circulation pump 5 is also reduced.

Conversely, when the heating load on the hot-water heating system is large and the difference between the temperatures of the hot water in the supply and return pipes 3, 4 is large, such as when the number of heat radiators 2 in operation is large or the temperatures of the rooms are low and the amount of heat radiated by the heat radiators 2 is large, the output rate of the circulation pump 5 is increased accordingly, supplying the hot water heat at a sufficient rate to the heat radiators 2 to maintain a desired heating effect.

The hot-water heating system is therefore capable of maintaining a desired heating effect and minimizing wasteful energy consumption by the circulation pump 5 for thereby increasing the efficiency with which energy is consumed by the circulation pump 5.

Since the temperature sensors 10, 11 are fixedly mounted on the respective outer surfaces of the supply pipe 3 and the return pipe 4, it is not necessary to provide the supply pipe 3 and the return pipe 4 with joints for installation of the temperature sensors 10, 11, and hence there is no danger of a leakage of hot water from the supply pipe 3 and the return pipe 4.

In the illustrated embodiment, the circulation pump 5 is connected to the supply pipe 3. However, the circulation pump 5 may be connected to the return pipe 4.

Although a certain preferred embodiment of the present invention has been shown and described in detail, it should be understood that various changes and modifications may be made therein without departing from the scope of the appended claims.

What is claimed is:

1. A hot-water heating system comprising:

a heater for producing hot water;

a heat radiator;

a supply pipe for supplying them hot water from said heater to said heat radiator;

a return pipe for returning said heat radiator to said heater;

a circulation pump for circulating the hot water from said heater successively through said supply pipe, said heat radiator, and said return pipe;

a supply pipe temperature sensor for detecting the temperature of the hot water flowing through said supply pipe;

a return pipe temperature sensor for detecting the temperature of the hot water flowing through said return pipe; and a control unit for controlling said circulation pump to reduce an output rate thereof as the difference between the temperatures of the hot water detected by said supply pipe temperature sensor and said return pipe temperature sensor is reduced.

2. A hot-water heating system according to claim 1, wherein said circulation pump comprises a motor-driven pump energizable by an AC power supply, and said control unit comprises means for determining a period to energize said circulation pump depending on the difference between the temperatures of the hot water detected by said supply pipe temperature sensor and said return pipe temperature sensor, and energizing said circulation pump with said AC power supply during the determined period thereby to control the output rate of said circulation pump.

3. A hot-water heating system according to claim 2, wherein said means comprises means for generating a signal having a level which is greater as the difference between the temperatures of the hot water detected by said supply pipe temperature sensor and said return pipe temperature sensor is smaller, means for generating a triangular-wave signal in synchronism with electric energy from said AC power supply, and means for determining as said period a period in which the level of said triangular-wave signal is not smaller than the level of the generated signal.

4. A hot-water heating system according to claim 1, wherein said control unit comprises means for controlling the output rate of said circulation pump substantially at a maximum output rate for a predetermined period of time after the hot-water heating system has started to operate, and controlling the output rate of said circulation pump based on the difference between the temperatures of the hot water detected by said supply pipe temperature sensor and said return pipe temperature sensor after elapse of said predetermined period of time.

5. A hot-water heating system according to claim 1, wherein said supply pipe temperature sensor is fixedly mounted on an outer surface of said supply pipe, and said return pipe temperature sensor is fixedly mounted on an outer surface of said return pipe.

* * * * *